(12) United States Patent
Drake et al.

(10) Patent No.: US 11,392,981 B2
(45) Date of Patent: Jul. 19, 2022

(54) IN-REAL LIFE MEDIA PLATFORM ANALYTICS (IRL-MPA) SYSTEM

(71) Applicant: T-Mobile USA, Inc., Bellevue, WA (US)

(72) Inventors: Aaron Drake, Sammamish, WA (US); Araceli Lesko, Bainbridge Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 576 days.

(21) Appl. No.: 15/881,484

(22) Filed: Jan. 26, 2018

(65) Prior Publication Data
US 2019/0236640 A1    Aug. 1, 2019

(51) Int. Cl.
G06Q 30/02      (2012.01)
G06F 16/9535    (2019.01)

(52) U.S. Cl.
CPC ..... *G06Q 30/0244* (2013.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2010/0023398 A1* | 1/2010 | Brown | ........ | G06Q 30/02 705/14.49 |
| 2011/0066497 A1* | 3/2011 | Gopinath | ........ | G06Q 30/02 705/14.53 |
| 2011/0106662 A1* | 5/2011 | Stinchcomb | ........ | G06Q 50/01 715/757 |
| 2012/0124486 A1* | 5/2012 | Robinson | ........ | G06Q 10/10 715/753 |
| 2014/0019542 A1* | 1/2014 | Rao | ........ | H04L 67/306 709/204 |

(Continued)

OTHER PUBLICATIONS

Elisa et al., "Content marketing metrics: Theoretical aspects and empirical evidence." European Scientific Journal 10.34 (2014) (Year: 2014).*

*Primary Examiner* — Christopher B Tokarczyk
(74) *Attorney, Agent, or Firm* — Han Santos, PLLC

(57) ABSTRACT

This disclosure describes techniques for generating curated In-Real Life (IRL) media data for distribution via third-party multimedia platform(s), and further providing an engagement entity (i.e., producer, merchant, or curator) with a recommendation to solicit an interaction with another engagement entity. Particularly, an IRL-Media Platform Analytics (IRL-MPA) system is described that can create curated IRL-media data by refining a presentation of raw IRL-media data, and further embedding product-service offerings and engagement requests. The IRL-MPA system may configure the curated IRL-media data for playback on one or more third-party platforms, such that a viewing audience member may respond to an engagement request embedded within the curated IRL-media data. The IRL-MPA system may also initiate establishing a communication channel between the audience member and a selected engagement entity on the engagement platform, monitoring an ensuing interaction, and further provide the engagement entity with a recommendation, based on an analysis of the interaction.

20 Claims, 6 Drawing Sheets

(56) References Cited

U.S. PATENT DOCUMENTS

| | | | |
|---|---|---|---|
| 2014/0156392 A1* | 6/2014 | Ouimet | G06Q 30/02 705/14.49 |
| 2015/0271557 A1* | 9/2015 | Tabe | H04N 21/6131 725/14 |
| 2015/0347593 A1* | 12/2015 | Tsai | G06Q 50/01 707/722 |
| 2017/0180496 A1* | 6/2017 | Comstock | H04W 4/14 |

* cited by examiner

IN-REAL LIFE MEDIA PLATFORM ANALYTICS (IRL-MPA) SYSTEM

BACKGROUND

Present day, third-party media platforms have provided producers of media data with several mediums to share in-real-life media data. These platforms can facilitate the promotion and marketing of a producer's own talents, to an audience that would otherwise be unreachable. However, while third-party media platforms provide a mechanism for producers to present and promote their own talent, these platforms lack a means by which a producer may refine a presentation of their own media data, or facilitate a means by which an audience may separately engage with the producer regarding the media data.

Further, third-party media platforms are set-up such that producers lack substantive control or influence over the selection and placement of sponsored product-service offerings that accompany a playback of their media. In fact, third-party media platforms can independently select and overlay sponsored product-service offerings to accompany media data, without any creative influence or curating input from a producer of the media data.

Thus, present day, producers can be burdened with promoting and marketing their own creativity, while facing a technological burden of independently curating their own media data and lacking substantive control or influence over a selection and placement of sponsored product-service offerings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
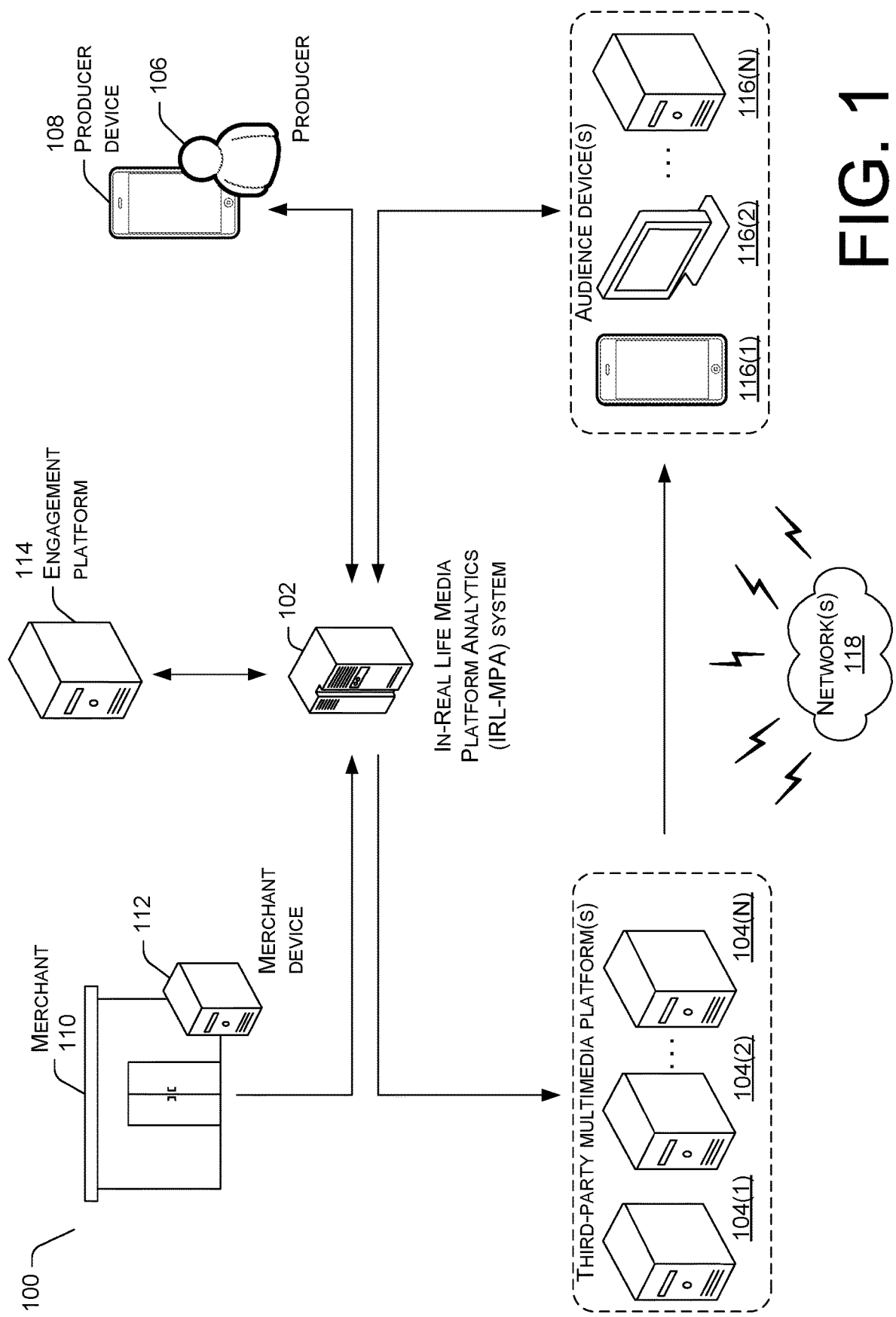
FIG. 1 illustrates a schematic view of a computing environment that facilitates an In-Real Life (IRL) Media Analytics Platform (IRL-MPA) system.

This disclosure describes techniques that facilitate generating curated In-Real Life (IRL) media data for distribution to audience members of one or more third-party multimedia platforms. The IRL-media data may comprise of raw IRL-media data that is captured by a producer's client device and further refined using curating tools that modify presentation features of the IRL-media data. More specifically, an IRL-Media Platform Analytics (IRL-MPA) system is described that may facilitate generating curated IRL-media data, and further configuring the curated IRL-media data for presentation on one or more third-party multimedia platforms. In some examples, the curated IRL-media data may include a placement of product-service offerings during a playback of the curated IRL-media data. Each product-service offering may further include an engagement request embedded within, that upon selection by an audience member, initiates a process of establishing a communication channel with an engagement entity on the engagement platform. The engagement entity may correspond to one of a producer, merchant, or curator, associated with the curated IRL-media data. In various examples, the communication connection may be established on an engagement platform that is native to the IRL-MPA system and independent from each of the third-party multimedia platforms.

In response to establishing a communication channel, the IRL-MPA system may parse through communications conducted on the engagement platform, and further generate one or more recommendations for distribution to the engagement entities. For example, an audience member may selectively request to interact with a producer of curated IRL-media data. The IRL-MPA system may monitor the interaction on the engagement platform, and further provide the producer (i.e., engagement entity) with recommendations relating to other product-service offerings that may appeal to the audience member, based on the audience member's profile data. By providing the producer with recommendations of producer-service offerings to embed in future, curated IRL-media data, the IRL-MPA system may improve a producer's interactions with merchants by recommending relevant product-service offerings that are likely to appeal to the producer's existing audience.

Similarly, the IRL-MPA system may receive an engagement request from an audience member to interact with a merchant associated with a product-service offering that is embedded as a marketing element within curated IRL-media data, or a curator of the curated IRL-media data. In this instance, the IRL-MPA system may monitor each respective interaction on the engagement platform, and further provide the merchant or curator (i.e., engagement entities) with recommendations relating to additional producers that may present their product-service offerings as marketing elements within curated IRL-media data.

In the illustrated example, the IRL-MPA system may be configured to receive, via a producer device, raw IRL-media data for curation and distribution via one or more third-party media platforms. The raw IRL-media data may comprise of an audio-based media stream, a video-based media stream, or an audiovisual-based media stream. The IRL-MPA system may authenticate an identity of the producer and further present one or more curating tools to refine a presentation of the raw IRL-media data, and one or more product-service offerings to embed as marketing elements within the curated IRL-media data.

The curating tools may relate to modifying features of the raw IRL-media data such as, lighting, sound mixing, title and broadcast graphics, color corrections, visual effects, motion graphics, or any combination thereof. Additionally, the curating tools may facilitate various ways of embedding a marketing element within curated IRL-media data. For example, a product-service offering may be incorporated via an interstitial placement, an overlaid placement, or an inset placement within curated IRL-media data. An interstitial placement refers to embedding a marketing element between portions of the curated IRL-media data. An overlaid placement refers to placement of the marketing element within a foreground of the curated IRL-media data such that the marketing element may obstruct a portion of the curated IRL-media data. An example of an overlaid placement may include a banner marketing element that appears in the foreground of curated IRL-media data. An inset placement of a marketing element refers to placement of the marketing element in a background of the curated IRL-media data such that it does not obstruct the foreground of the curated IRL-media data. An example of an inset placement of a marketing element may comprise of a marketing label that is affixed to a building, lamppost or fixture that is presented within the curated IRL-media data.

In some examples, the curating tools may be used to incorporate an engagement request within the curated IRL-media data. The engagement request may be associated with an engagement entity, such as a producer of the raw IRL-media data, a curator of the curated IRL-media data, one or more merchants that present product-service offerings within the curated IRL-media data, or any combination thereof. Further, the engagement request may be embedded via an interstitial placement, an overlaid placement, or an inset placement within the curated IRL-media data. In one example, the engagement request may comprise of a selectable option that, upon selection by an audience member, automatically initiates a process to establish a communication channel with an engagement entity on an engagement platform native to the IRL-MPA system. In another example, the engagement request may provide of text instructions or audio instructions that inform an audience member of a process to establish a communication channel with the engagement entity on the engagement platform.

Further, the IRL-MPA system may present one or more options relating to embedding a product-service offering as a marketing element within curated IRL-media data. These options may include a selection of product-service offerings to be embedded as a marketing element within the curated IRL-media data, an offering of curating services to generate the curate IRL-media data from the raw IRL-media data, or a combination of both.

In response to generating curated IRL-media data, based on one or more selections from a producer, the IRL-MPA system may generate an IRL-media data packet for transmission to at least one third-party multimedia platform for dissemination to one or more audience members. In some examples, the IRL-MPA system may transmit the curated IRL-media data to multiple third-party multimedia platforms. In this example, the IRL-MPA system may generate multiple IRL-media data packets that each include computer-executable instructions that are configured to execute (i.e., playback) the curated IRL-media data on one of the multiple third-party media platforms. In a non-limiting example, a third-party multimedia platform may include a preferred social media platform, a preferred social networking platform, or a preferred media-sharing platform, and/or so forth.

In the illustrated example, the IRL-MPA system may be further configured to establish a communication channel between an audience member and an engagement entity (i.e., producer, curator, or merchant) on an engagement platform native to the IRL-MPA system. The communication channel may correspond to a real-time audio-based communication connection, a real-time text-based communication connection, a real-time audio-visual communication connection, or a real-time social media platform connection. In some examples, an audience member may be prompted to register with the IRL-MPA system prior to interacting with an engagement entity on the engagement platform. In doing so, the IRL-MPA system may capture profile data for the audience member, such as demographic data, categories of product interest, categories of service interest, categories of IRL-media data interest, or any combination thereof.

Moreover, the IRL-MPA system may monitor each interaction, via the communication channel, on the engagement platform, and further employ a data mining algorithm to extract relevant metadata, such as words, terms, phrases, quotes, or ratings. The data mining algorithm may be configured to extract relevant metadata from a text-based or audio-based interaction. Relevant metadata may include an audience member's preferences for product-service offerings, appreciation of a genre of producer IRL-media data, or a comment relating to curation of the curated IRL-media data. The data mining algorithm may use both machine learning and non-machine learning techniques such as decision tree learning, association rule learning, artificial neural networks, inductive logic, Support Vectors Machine (SVMs), clustering, Bayesian networks, reinforcement learning, representation learning, similarity and metric learning, and sparse dictionary learning to extract the patterns.

Additionally, the IRL-MPA system may parse through the relevant metadata to determine an engagement context for an interaction. The engagement context may depend on an identity of an engagement entity (i.e., producer, curator, or merchant). In some examples, an engagement context may include, but is not limited to, a producer, a category of producers, a curator, a category of curators, a merchant, a category of merchants, a product, a category of products, a service, a category of service, an event a category of events, a merchant, a place, a category of places, or any combination thereof.

Further, the IRL-MPA system may generate and store engagement metadata that includes engagement context, relevant metadata, and profile data of the audience member. The IRL-MPA system may then parse through the engagement metadata to identify data patterns between the engagement metadata and profile data associated with the engagement entity. In doing so, the IRL-MPA system may generate and assign an Audience-Interaction (AI) score for the engagement entity that numerically quantifies a relevance of the engagement entity's interaction with the audience member.

In a non-limiting example, consider an interaction via an engagement platform of the IRL-MPA system, between an audience member and a merchant (i.e., engagement entity), who deals with "vintage automobile sales." The IRL-MPA system may generate engagement metadata for the interaction that includes an engagement context, profile data of the audience member, and relevant metadata, such as words, phrases, and quotes that relate to the interaction. In this example, the IRL-MPA system may determine the engagement context as a "category of vintage automobiles."

Moreover, the IRL-MPA system may generate and assign an AI-score for the merchant that numerically quantifies a relevance of the merchant's interaction with the audience member. In other words, the IRL-MPA system may parse through profile data of the merchant to identify the merchant's interests or preferences; and, in doing so, assign an AI-score that reflects a correlation of the merchant's profile data and the interaction with the audience member. Continuing with the previous example, the IRL-MPA system may identify a merchant interest relating to "vintage automobile sales." The same interest or preference may be derived from the profile data based on the product-service offering embedded within the curated IRL-media data. In this way, the IRL-MPA system may assign an AI-score that reflects a relatively high level of relevancy, based on a correlation of the engagement context (i.e., category of vintage automobiles) and the merchant's profile data (i.e., vintage automobile sales).

Alternatively, consider another example in which the IRL-MPA system determines the engagement context for an interaction between the same merchant and audience member relates to "a particular music event." In this example, the IRL-MPA system may assign an AI-score that reflects a relatively low level of relevancy, based on a lack of reference to the "particular music event" within the merchant's profile data.

In the illustrated example, the IRL-MPA system may provide an engagement entity with one or more recommendations, based on an interaction with an audience member on the engagement platform. Each recommendation may propose that an engagement entity solicit an interaction with other engagement entities that have historically served a same audience member, or a group of similar audience members. The purpose of each recommendations is intended to help each engagement entity broaden their base of audience members. For example, the IRL-MPA system may provide a producer (i.e., engagement entity) with recommendations to solicit an interaction with merchants or curators (i.e., engagement entities) that the producer is yet to engage, but whom have historically served an audience member or similar audience members. In doing so, the producer may find merchants who are interested in compensating the producer for having the merchant's product-service offerings embedded as marketing elements within the producer's curated IRL-media data.

Similarly, the IRL-MPA system may provide a merchant (i.e., engagement entity) with recommendations to solicit an interaction with producers (i.e., engagement entity) that have historically served an audience member associated with the interaction or similar audience members. In this example, the merchants may find producers that already focus on their target audience, and thus whom may be amenable to having the merchant's product-service offerings embedded as marketing elements within their (i.e., producer's) curated IRL-media data. Additionally, the IRL-MPA system may provide a curator with a recommendation of producers that have historically served an audience member associated with the interaction, or a group of similar audience members.

Each recommendation may be based on engagement metadata and AI-scores that relate to interactions between an engagement entity and various audience members on the engagement platform. For example, the IRL-MPA system may determine whether an AI-score for a current interaction between an audience member and a first engagement entity is greater than or equal to a predetermined AI threshold. The predetermined AI threshold may be set by an administrator of the IRL-MPA system.

In response to determining that the AI-score is greater than or equal to a predetermined AI threshold, the IRL-MPA system may analyze data patterns between the engagement metadata of the current interaction and profile data associated with additional engagement entities registered with the IRL-MPA system. The IRL-MPA system may assign a similarity score to each additional engagement entity based on a degree of correlation between the engagement metadata of the current interaction and profile data of the additional engagement entity.

Further, the IRL-MPA system may present the first engagement entity with a recommendation to solicit an interaction with a second engagement entity (i.e., additional engagement entity), based on a similarity score assigned to the second engagement entity being greater than or equal to a predetermined similarity threshold. In this example, the predetermined similarity threshold may be set by an administrator of the IRL-MPA system.

In various examples, the IRL-MPA system may analyze a dataset of historical interactions between a plurality of engagement entities and audience members over a predetermined time interval. In doing so, the IRL-MPA system may generate one or more recommendations for an engagement entity to solicit an interaction with another engagement entity. The dataset of historical interactions may include AI-scores for individual interactions between engagement entities and various audience members, profile data associated with the various audience members, corresponding engagement metadata, and corresponding recommendations, if any, that were offered to engagement entities as a result of each individual interaction.

In one example, the IRL-MPA system may use one or more trained machine learning models to analyze for data patterns between the engagement metadata of a current interaction and the dataset of historical interactions. In some examples, the resultant analysis may be represented as a statistical model that comprises of a numerical distribution of data-points based on correlations within the underlying, dataset of historical interactions.

Further, the IRL-MPA system may further assign a similarity score to each audience member within the dataset of historical interactions based on a degree of correlation with the engagement metadata of the current interaction. The IRL-MPA system may further generate a subset of audience members by aggregating individual audience members that have a similarity score that is greater than or equal to a predetermined similarity threshold.

The IRL-MPA system may identify a second engagement entity from profile data associated with an audience member of the subset of audience members. In doing so, the IRL-MPA system may present the first engagement entity with a recommendation to solicit an interaction with a second engagement entity, based at least in part on a commonly shared, audience.

In a first non-limiting example, the IRL-MPA system may analyze for data patterns between engagement metadata of a current interaction between a merchant (i.e., engagement entity) and an audience member, and a dataset of historical interactions. In doing so, the IRL-MPA system may provide the merchant with one or more recommendations to solicit an interaction with producers (i.e., other engagement entities) that service a similar subset of audience members.

In a second non-limiting example, the IRL-MPA system may analyze for data patterns between engagement metadata of a current interaction between a producer (i.e., engagement entity) and an audience member, and a dataset of historical interactions. In doing so, the IRL-MPA system may provide the producer with one or more recommendations to solicit an interaction with merchants (i.e., other engagement entities that the producer is yet to engage) that serves a similar subset of audience members.

In a third non-limiting example, the IRL-MPA system may analyze for data patterns between engagement metadata of current interaction between a curator (i.e., engagement entity) of raw IRL-media data and an audience member, and a dataset of historical interactions. In doing so, the IRL-MPA system may provide the curator with one or more recommendations to solicit an interaction with producers (i.e., other engagement entities that the curator is yet to engage) that service a similar subset of audience members.

The term "producer," as used herein, is intended to describe an individual, or entity, that generates raw IRL-media data. In one example, the producer may further curate, via the IRL-MPA system, the raw IRL-media data to generate a curated IRL-media data. Alternatively, the producer may transmit the raw IRL-media data to the IRL-MPA system and request curating services from a curating merchant.

The term "merchant," as used herein, is intended to describe an individual, or entity, that provides product-service offerings for incorporation within a curated IRL-media data. Product-service offerings may include an offering of any tangible product or service that can be offered to consumers for purchase. In a non-limiting example, the product-service offering may include curating services of raw IRL-media data.

The term "audience," as used herein, is intended to describe an individual, or entity, that accesses the curated IRL-media data for viewing via one or more third-party multimedia platforms.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment that facilitates an In-Real Life (IRL) Media Analytics Platform (IRL-MPA) system 102. The IRL-MPA system 102 may facilitate generating curated IRL-media data for distribution to audience members of one or more third-party multimedia platform(s) 104(1)-104(N).

In the illustrated example, a producer 106 may generate, via a producer device 108, raw IRL-media data that comprises of an audio-based media stream, a video-based media stream, or an audiovisual-based media stream. In doing so, the producer 106 may transmit the IRL-media data to the IRL-MPA system 102. The producer 106, or curator, may refine a presentation of the raw IRL-media data using one or more curating tools native to the IRL-MPA system 102. Further, the producer 106, or curator, may incorporate one or more product-service offerings associated with a merchant 110. In this example, the merchant 110 may transmit, via a merchant device 112, one or more product-service offerings to the IRL-MPA system 102 for presentation to the producer 106 as options for incorporating as marketing elements in curated IRL-media data.

Moreover, the IRL-MPA system 102 may generate IRL-media data packet(s) for transmission to one or more third-party multimedia platform(s) 104(1)-104(N). Each IRL-media data packet may include computer-executable instructions that are configured to execute (i.e., playback) the curated IRL-media data on one of the third-party multimedia platform(s) 104(1)-104(N).

Further, the curated IRL-media data may include an engagement request embedded within, that upon selection by an audience member, initiates a process of establishing a communication channel with an engagement entity on an engagement platform 114. The engagement platform 114 may be native to the IRL-MPA system 102 and independent from each of the third-party multimedia platform(s) 104(1)-104(N).

The IRL-MPA system 102 may monitor an interaction between an engagement entity (i.e., producer, merchant, or curator) and audience member on the engagement platform 114, and further generate one or more recommendations for the engagement entity.

In the illustrated example, the producer device 108 and audience device(s) 116(1)-116(N) may correspond to any sort of electronic device operating on the telecommunications network, such as a cellular phone, a smart phone, a tablet computer, an electronic reader, a media player, a gaming device, a personal computer (PC, a laptop computer), etc. The producer device 108 and audience device(s) 116(1)-116(N) may have a subscriber identity module (SIM), such as an eSIM, to identify the respective electronic device to a telecommunications service provider network (also referred to herein as "telecommunications network").

Additionally, the IRL-MPA system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the producer device 108 and audience device(s) 116(1)-116(N), via one or more network(s) 118.

The one or more network(s) 118 may include public networks such as the Internet, private networks such as an institutional and/or personal intranet, or some combination of private and public networks. The one or more network(s) 118 can also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), or any combination thereof.

Figure 2:
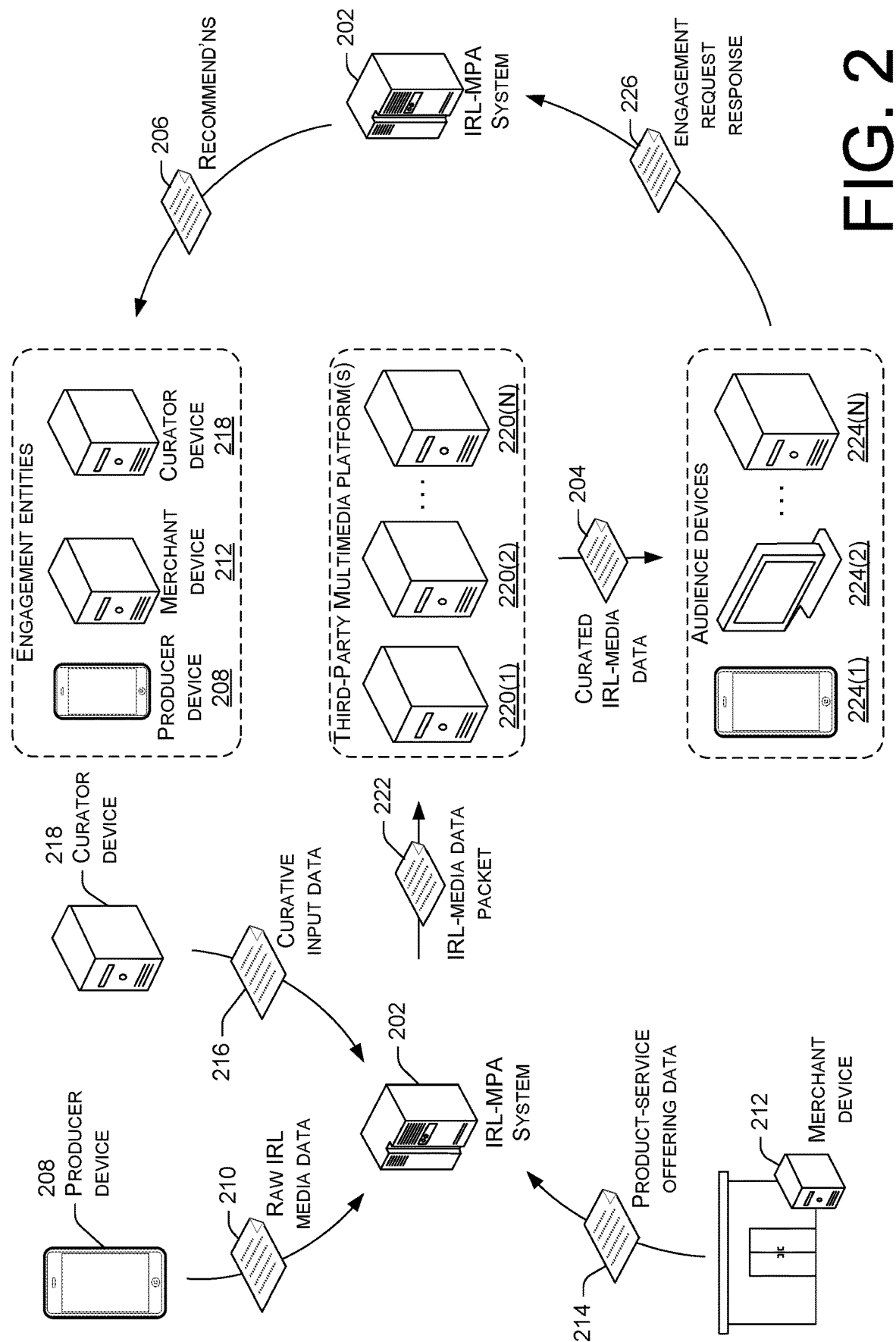
FIG. 2 illustrates a block diagram of an In-Real Life Media Platform Analytics (IRL-MPA) system process for generating curated IRL-media data, and further providing an engagement entity with one or more recommendations based on an interaction with an audience member on an engagement platform.

FIG. 2 illustrates a block diagram of an In-Real Life Media Platform Analytics (IRL-MPA) system 202 process for generating curated IRL-media data 204, and further providing an engagement entity (i.e., producer, merchant, or curator) with one or more recommendation(s) 206 based on an interaction with an audience member on an engagement platform.

In the illustrated example, the IRL-MPA system 202 may receive, from a producer device 208, raw IRL-media data 210 that comprises of an audio-based media stream, a video-based media stream, or an audiovisual-based media stream. The IRL-MPA system 202 may also receive, from a merchant device 212, product-service offering data 214 that is to be presented to producers, via the IRL-MPA system 202 as options for incorporating as marketing elements within a curated IRL-media data 204. The IRL-MPA system 202 may also receive curative input data 216, via a curator device 218, to refine a presentation of raw IRL-media data 210 and further create a curated IRL-media data 204 for playback on one or more third-party multimedia platform(s) 220(1)-220

(N). The curative input data 216 may include input instructions for refining a presentation of the raw IRL-media data 210 (i.e., color, lighting, sound-mixing, and/or so forth), embedding one or more product-service offerings as marketing elements within the curated IRL-media data 204, and one or more engagement requests that are intended to initiate a process of establishing a communication channel with an engagement entity (i.e., producer, merchant, or curator) associated with the curated IRL-media data 204. In some examples, the curator device 218 may correspond to the producer device 208.

In this way, the IRL-MPA system 202 may generate curated IRL-media data 204 for playback on one or more third-party multimedia platform(s) 220(1)-220(N), based at least in part on the aggregating the curative input data 216 into the raw IRL-media data 210.

Moreover, the IRL-MPA system 202 may generate an IRL-media data packet 222 for transmission to one or more third-party multimedia platform(s) 220(1)-220(N). The IRL-media data packet 222 may include computer-executable instructions that are configured to execute (i.e., playback) the curated IRL-media data 204 on one of the third-party multimedia platform(s) 220(1)-220(N).

In doing so, audience members may access the curated IRL-media data 204 on one of the third-party multimedia platform(s) 220(1)-220(N), via their respective, audience device(s) 224(1)-224(N). In some examples, an audience member, via one of the audience device(s) 224(1)-224(N), may transmit an engagement request response 226 to the IRL-MPA system 202. The engagement request response 226 is intended to initiate a process for establishing a communication channel between the audience member, via an audience device, and a selected engagement entity on an engagement platform native to the IRL-MPA system 202.

Additionally, the IRL-MPA system 202 may monitor a current interaction between the selected engagement entity and the audience member, and in doing so, provide the selected engagement entity with one or more recommendation(s) 206. The one or more recommendation(s) 206 may suggest that the selected engagement entity solicit an interaction with another engagement entity. In one example, a recommendation may suggest that a producer solicit an interaction with merchant or curator. In another example, a recommendation may suggest that a merchant or curator solicit an interaction with a producer.

Figure 3:
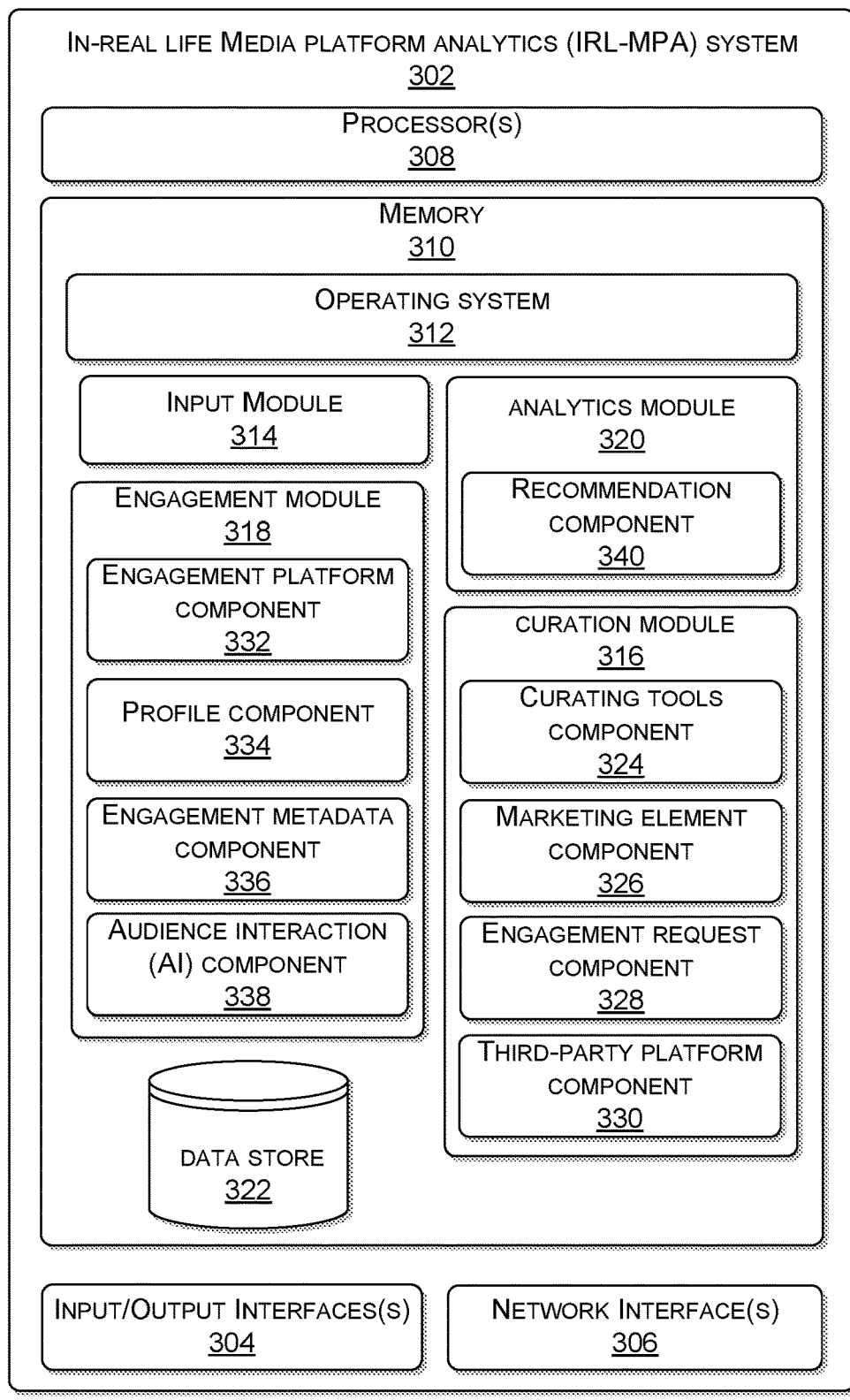
FIG. 3 illustrates a block diagram of various components of an In-Real Life Media Platform Analytics (IRL-MPA) system that can generate curated IRL-media data and further provide an engagement entity with one or more recommendations.

FIG. 3 illustrates a block diagram of various components of an In-Real Life Media Platform Analytics (IRL-MPA) system 302 that can generate curated IRL-media data and further provide an engagement entity with one or more recommendations. The IRL-MPA system 302 may include routines, program instructions, objects, and/or data structures that perform particular tasks or implement abstract data types. Further, the IRL-MPA system 302 may include input/output interface(s) 304. The input/output interface(s) 304 may include any type of output interface known in the art, such as a display (e.g., a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the IRL-MPA system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 306 may include wired communication components, such as an Ethernet port or a Universal Serial Bus (USB).

Further, the IRL-MPA system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, input module 314, a curation module 316, an engagement module 318, an analytics module 320, and a data store 322. The operating system 312 may be any operating system capable of managing computer hardware and software resources.

The input module 314 may receive data packets from an engagement entity (i.e., producer, merchant, or curator) or an audience member. For example, the input module 314 may receive raw IRL-media data from a producer; product-service offerings from a merchant; or, curated IRL-media data from a curator. Further, the input module 314 may receive a response to an engagement request embedded with curated IRL-media data, from an audience member.

The curation module 316 may further include a curating tool component 324, a marketing element component 326, an engagement request component 328, and a third-party platform component 330. The curating tool component 324 may include one or more tools that facilitate modifying features of raw IRL-media data. Curating tools may modify features such as lighting, sound, mixing, title and broadcast graphics, color corrections, visual effects, motion graphics, or any combination thereof.

The marketing element component 326 of the curation module 316 may facilitate various ways of embedding a marketing element within curated IRL-media data. For example, the marketing element component 326 may facilitate an interstitial placement, an overlaid placement, or an inset placement of a product-service offering within a curated IRL-media data.

The engagement request component 328 of the curation module 316 may facilitate various ways of embedding an engagement request within curated IRL-media data. For example, similar to the marketing element component 326, the engagement request component 328 may facilitate an interstitial placement, an overlaid placement, or an inset placement of an engagement request within curated IRL-media data.

The third-party platform component 330 of the curation module 316 may generate one or more IRL-media data packet(s) that each include computer-executable instructions configured to execute (i.e., playback) the curated IRL-media data on one of the multiple third-party media platforms.

The engagement module 318 may further include an engagement platform component 332, a profile component 334, an engagement metadata component 336, and an audience interaction (AI) component 338. The profile component 334 may generate profile data for an engagement entity (i.e., producer, merchant, or curator) or an audience member that interacts with the IRL-MPA system 302. For example, the IRL-MPA system 302 may request an engagement entity or an audience member register with the IRL-MPA system 302 prior to interacting with one another via an engagement platform. In doing so, profile component 334 may capture profile data for each engagement entity and audience member, such as demographic data, categories of product interest, categories of service interest, categories of IRL-media data interest, or any combination thereof.

The engagement platform component 332 of the engagement module 318 may initiate a process of establishing a communication channel between an engagement entity (i.e., producer, merchant, or curator) and an audience member. The engagement platform component 332 may initiate the process in response to receipt of a response to an engagement request via the input module 314. The engagement platform may be native to the IRL-MPA system and may require each of the engagement entity and audience member to authenticate their respective identities.

Moreover, the profile component 334 of engagement module 318 may capture preferences that influence interactions between engagement entities (i.e., producer, merchant, or curator) and an audience member. In one example, a producer may specify one or more criteria for use in selecting product-service offerings from merchants, or recommendations from the recommendation component 340 of the analytics module 320. For instance, the producer may indicate a preference for product-service offerings related to a set of a product, a category of products, a service, a category of services, an event, a category of events, a merchant, a category of merchants, a place, a category of places, or any combination thereof. The producer may further specify a geographic region, or proximity to a geographic location for which the producer may consider product-service offerings.

The producer may specify other criteria, such as a preference for placement (i.e., interstitial, overlaid, or inset placement) of a product-service offering within curated IRL-media data, a preferred length of time for a product-service offering, a preferred output resolution, a preferred revenue schema from a merchant, or any combination thereof.

Similarly, the profile component 334 may capture profile data associated with a merchant. For example, the merchant may specify a set of preferred producers, or a preferred category of producers, a preference for placement of a product-service offering, a preferred length of time, a preferred output resolution, a preferred revenue schema, or any combination thereof.

The engagement metadata component 336 of the engagement module 318 may generate engagement metadata associated with an interaction between an engagement entity (i.e., producer, merchant, or curator) and an audience member, on the engagement platform. The engagement metadata may include an engagement context, relevant metadata, and profile data of the audience member. In some examples, the engagement metadata component 336 may monitor an interaction on the engagement platform and employ a data mining algorithm to extract relevant metadata, such as words, terms, phrases, quotes, or ratings. Further, the engagement metadata component 336 may parse through the relevant metadata to determine an engagement context for the interaction. The engagement context may include, but is not limited to, a producer, a category of producers, a curator, a category of curators, a merchant, a category of merchants, a product, a category of products, a service, a category of service, an event a category of events, a merchant, a place, a category of places, or any combination thereof.

The AI component 338 of the engagement module 318 may parse through engagement metadata associated with an interaction between an engagement entity and an audience member on the engagement platform. Particularly, the AI component 338 may identify data patterns between the engagement metadata and profile data of the engagement entity. In doing so, the AI component 338 may generate and assign an AI-score for the engagement entity that numerically qualifies a relevance of an engagement entity's interaction with the audience member on the engagement platform.

The AI-score may be an alpha-numeric expression (i.e., 0 to 10, or A to F), a descriptive expression (i.e., low, medium, or high), based on color (i.e., red, yellow, or green), or any other suitable scale that reflects a degree of correlation between the engagement metadata and profile data of the engagement entity.

The analytics module 320 may analyze engagement metadata of a current interaction on the engagement platform. In some examples, the analytics module 320 may analyze engagement metadata in response to determining that an AI-score associated with the engagement metadata is greater than or equal to a predetermined AI threshold. Otherwise, the analytics module 320 may surmise that the underlying interaction on the engagement platform was not relevant to the interests of the engagement entity. The predetermined AI threshold may be set by an administrator of the IRL-MPA system.

In a first example, the analytics module 320 may use one or more trained machine learning models to analyze data patterns between engagement metadata of a current interaction and profile data associated with additional engagement entities registered with the IRL-MPA system 302. The profile data of additional engagement entities may be stored within the data store 322 of the IRL-MPA system 302. In some examples, the analytics module 320 may assign a similarity score to each additional engagement entity based on a degree of correlation between the engagement metadata of the current interaction and profile data of the additional engagement entity.

The similarity score may be an alpha-numeric expression (i.e., 0 to 10, or A to F), a descriptive expression (i.e., low, medium, or high), based on color (i.e., red, yellow, or green), or any other suitable scale that reflects a degree of correlation between the engagement metadata and profile data of an additional audience member.

Continuing with the first example, the analytics module 320 may identify a subset of additional engagement entities with similarity scores that are greater than or equal to a predetermined similarity threshold. The predetermined similarity threshold may be set by an administrator of the IRL-MPA system 302. The recommendation component 340 of the analytics module 320 may then generate a recommendation for a first engagement entity, (i.e., who engaged in a current interaction with an audience member on the engagement platform) to solicit an interaction with a second engagement entity (i.e., additional engagement entity) identified within the subset of additional engagement entities.

In another example, the analytics module 320 may use one or more trained machine learning models to analyze for data patterns between engagement metadata of a current interaction and a dataset of historical interactions. In some examples, the resultant analysis may be represented as a statistical model that comprises of a numerical distribution of data-points based on correlations within the underlying, dataset of historical interactions.

In this example, the analytics module 320 may assign a similarity score to each audience member within the dataset of historical interactions based on a degree of correlation with the engagement metadata of the current interaction. The analytics module 320 may further generate a subset of audience members by aggregating individual audience members that have a similarity score that is greater than or equal to a predetermined similarity threshold. The predetermined similarity threshold may be set by an administrator of the IRL-MPA system 302.

Continuing with the second example, the recommendation component 340 may then generate a recommendation for a first engagement entity, (i.e., who engaged in a current interaction with an audience member on the engagement platform) to solicit an interaction with a second engagement entity (i.e., additional engagement entity) identified within profile data of an audience member of the subset of audience members.

Each recommendation may be based at least in part on an identity of the engagement entity who engaged in the current interaction on the engagement platform. For example, the recommendation component 340 may generate a recommendation for a producer (i.e., engagement entity) to solicit an interaction with a merchant (i.e., additional engagement entity) for incorporating product-service offerings within curated IRL-media data. In another example, the recommendation component 340 may generate a recommendation for a curator (i.e., engagement entity) to solicit an interaction with a producer (i.e., additional engagement entity) to offer curating services for refining a presentation of raw IRL-media data.

The data store 322 may include a repository of profile data associated with engagement entities (i.e., producers, merchants, or curators) and audience members that have registered with the IRL-MPA system 302 and a dataset of historical interaction data that may be used to analyze a current interaction on the engagement platform. The dataset of historical interactions may be stored within a data store may further include AI-scores for historical interactions between engagement entities and various audience members, profile data associated with the various audience members, corresponding engagement metadata, and corresponding recommendations, if any, that were offered to engagement entities as a result of each individual interaction.

Figure 4:
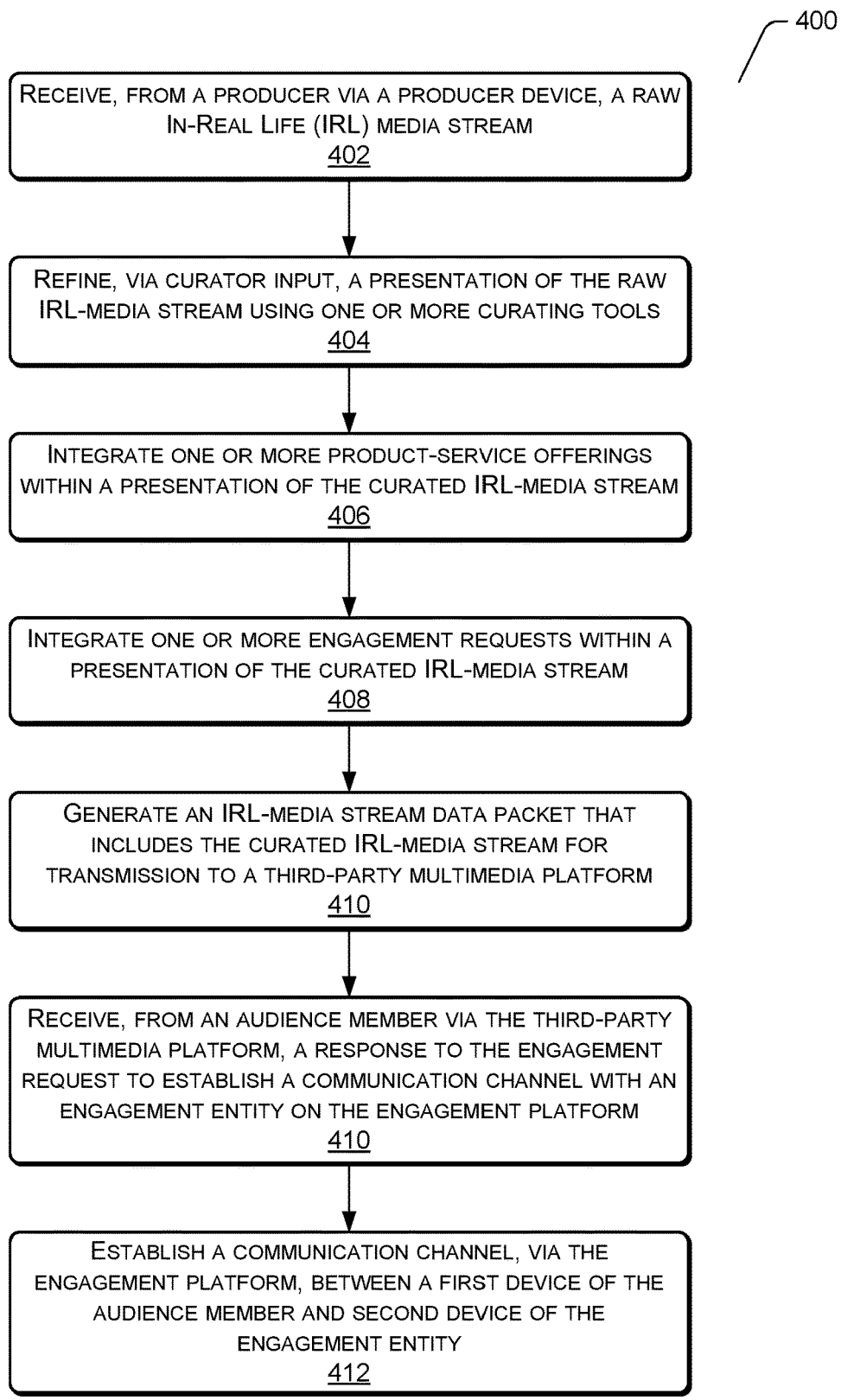
FIG. 4 illustrates a flow diagram of an In-Real Life (IRL) Media Platform Analytics (IRL-MPA) system process for establishing a communication channel between an audience member and an engagement entity on an engagement platform of the IRL-MPA system.
Figure 5:
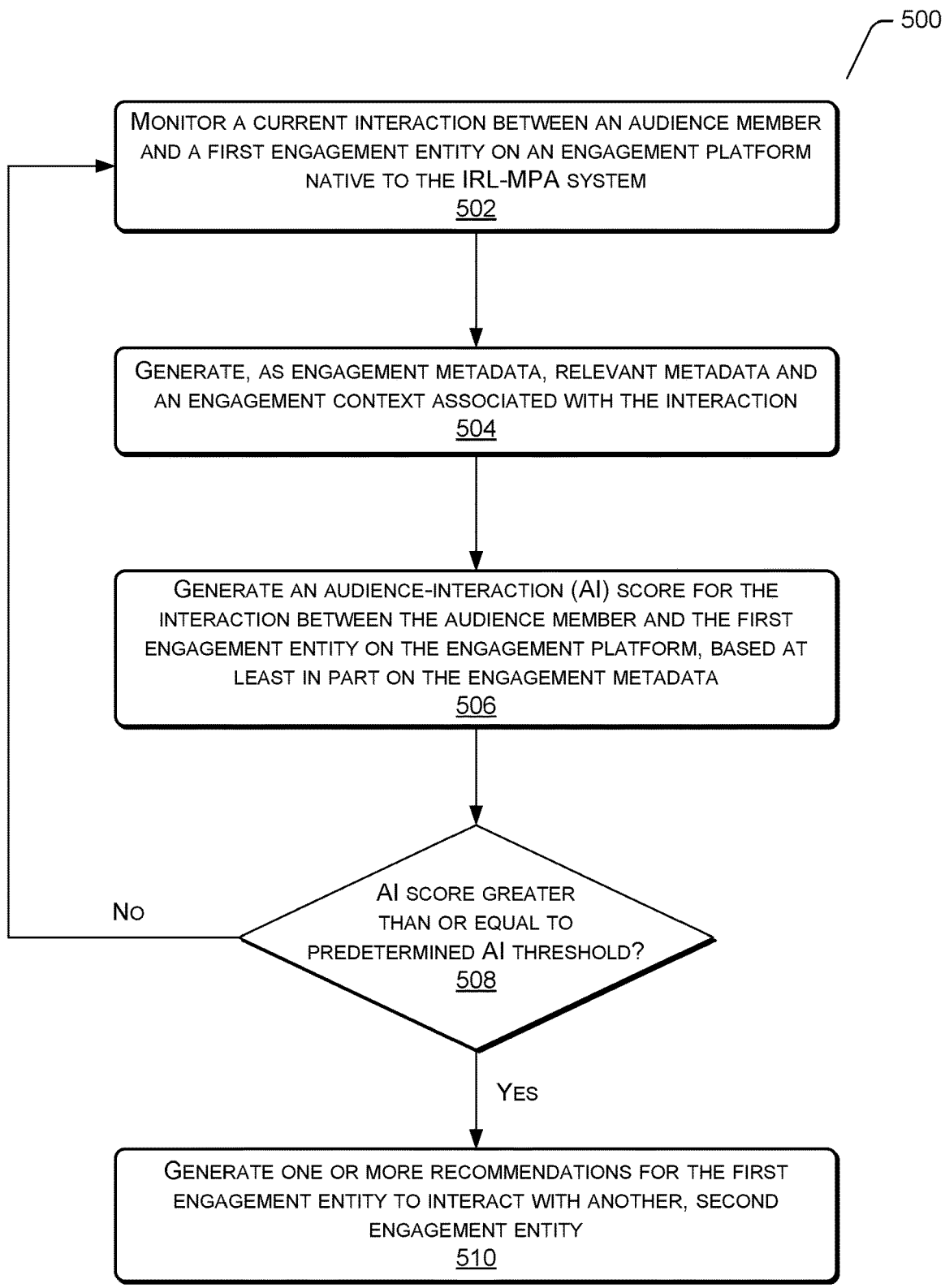
FIG. 5 illustrates a flow diagram of an In-Real Life (IRL) Media Platform Analytics (IRL-MPA) system process for generating one or more recommendations for an engagement entity based on an interaction between an audience member and the engagement entity via the engagement platform.
Figure 6:
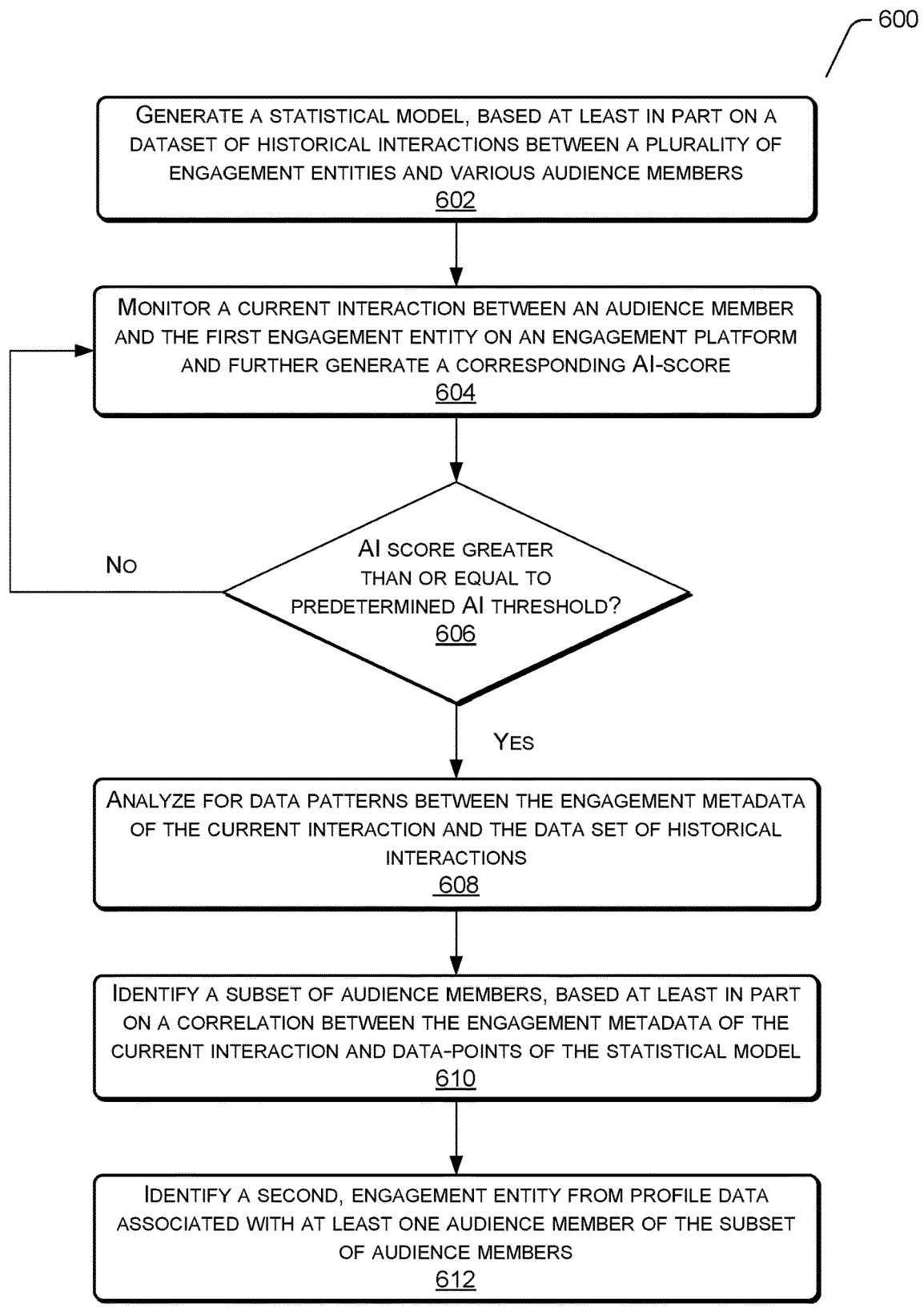
FIG. 6 illustrates a flow diagram of an In-Real Life (IRL) Media Platform Analytics (IRL-MPA) system process for generating one or more recommendations for an engagement entity, based at least in part on an analysis of a current interaction between an engagement entity and an audience member using a statistical model.

FIGS. 4, 5, and 6 present processes 400, 500, and 600 that relate to operations of the In-Real Life Video Platform Analytics (IRL-MPA) system. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a flow diagram of an In-Real Life (RL) Media Platform Analytics (IRL-MPA) system process for establishing a communication channel between an audience member and an engagement entity on an engagement platform of the IRL-MPA system. In one example, the audience member may have viewed curated IRL-media data on one or multiple third-party multimedia platforms, and in doing so, selectively request to communicate with an engagement entity (i.e., producer, curator, or merchant) associated with the curated IRL-media data via an engagement platform native to the IRL-MPA system.

At 402, the IRL-MPA system may receive from a producer, via a producer device, raw In-Real Life (IRL) media data. In some examples, the producer may capture the raw IRL-media data via an input interface of the producer device, such as a camera, a microphone, or a combination of both. Further, the raw IRL-media data may comprise of an audio-based media stream, a video-based media stream, or an audio-visual based media stream.

At 404, the IRL-MPA system may refine, via curator input, a presentation of the raw IRL-media data using one or more curating tools. For example, the IRL-MPA system may facilitate a producer, or a curator merchant, to refine a presentation of the raw IRL-media data by modifying lighting, sound, title and broadcast graphics, or any combination thereof. The IRL-MPA system may further provide curating tools that apply color corrections, visual effects, or motion graphics to raw IRL-media data.

At 406, the IRL-MPA system may integrate one or more product-service offerings within a presentation of the curated IRL-media data. In some examples, the IRL-MPA system may present a producer with a listing of one or more product-service offerings that may be embedded within curated IRL-media data as a marketing element. The producer may select a product-service offering from the listing, and further choose whether the product-service offering is to be incorporated via an interstitial placement, an overlaid placement, or an inset placement within the curated IRL-media data.

At 408, the IRL-MPA system may further integrate one or more engagement requests within a presentation of the curated IRL-media data. An engagement request may facilitate communication between an audience member that has viewed the curated IRL-media data and an engagement entity associated with curated IRL-media data. An engagement entity may correspond to one of a producer of the raw IRL-media data, a curator of the curated IRL-media data, one or more merchants associated with product-service offerings embedded as marketing elements within the curated IRL-media data, or any combination thereof.

Further, the IRL-MPA system may provide one or more selectable options to embed an engagement request via an interstitial placement, an overlaid placement, or an inset placement within the curated IRL-media data. In one example, the engagement request, once embedded within curated IRL-media data, may provide a selectable option, that upon selection by the audience member, automatically initiates a process of establishing a communication channel with an engagement entity on the engagement platform. Alternatively, the engagement request may provide text instructions or audio instructions that inform an audience member of a process to establish a communication channel with the engagement entity on the engagement platform.

At 410, the IRL-MPA system may generate an IRL-media data packet that includes the curated IRL-media data for transmission to one or more third-part media platforms. In this example, the curated IRL-media data may comprise of a refined presentation of the raw IRL-media data; and, further include one or more product-service offerings embedded as marketing elements, and one or more corresponding engagement requests associated with engagement entities (i.e., producer, merchant, or curator) associated with the curated IRL-media data.

Further, the IRL-media data packet may include computer-executable instructions that are configured to execute the curated IRL-media data one of multiple third-party media platforms. In one examples, a third-party multimedia platform may include a preferred social media platform, a preferred social networking platform, or a preferred media-sharing platform, and/or so forth.

At 412, the IRL-MPA system may receive, from an audience member via a third-party multimedia platform, a response to an engagement request to establish a communication channel with an engagement entity on an engagement platform native to the IRL-MPA system. In one example, the IRL-MPA system may selectively prompt the audience member to authenticate their identity with the IRL-MPA system; or, alternatively, register with the IRL-MPA system prior to interacting with an engagement entity on the engagement platform. In doing so, the IRL-MPA system may capture profile data associated with the audience member.

At 414, the IRL-MPA system may establish a communication channel, via the engagement platform, between a first device associated with the audience member and a second device associated with the engagement entity. The communication channel may comprise of a real-time audio-based communication connection, a real-time text-based communication connection, a real-time audio-visual communication connection, or a real-time social media platform connection.

FIG. 5 illustrates a flow diagram of an In-Real Life (IRL) Media Platform Analytics (IRL-MPA) system process for generating one or more recommendations for an engagement entity based on a current interaction between an audience member and the engagement entity via the engagement platform. Each recommendation may propose that an engagement entity solicit an interaction with an additional engagement entity based on a similarity between engagement metadata and profile data of the additional engagement entity. In one example, the IRL-MPA system may propose that a producer (i.e., engagement entity) solicit an interaction with a merchant (i.e., additional engagement entity) for incorporating product-service offerings within curated IRL-media data. In another example, the IRL-MPA system may propose that a curator (i.e., engagement entity) solicit an interaction with a producer (i.e., additional engagement entity) to offer curating services for refining a presentation of raw IRL-media data.

At 502, the IRL-MPA system may monitor a current interaction between an audience member and a first engagement entity (i.e., producer, merchant, or curator) via the engagement platform native to the IRL-MPA system. In this example, the IRL-MPA system may use a data mining algorithm to extract relevant metadata, such as words, terms, phrases, quotes, or ratings from a current interaction on the engagement platform. The data mining algorithm may be configured to extract relevant metadata from a text-based or audio-based interaction.

At 504, the IRL-MPA system may IRL-MPA system may generate engagement metadata associated with the current interaction. The engagement metadata may include an engagement context of the current interaction, the relevant metadata extracted by the data mining algorithm, and profile data of the audience member. In some examples, the IRL-MPA system may determine an engagement context based on the relevant metadata. An engagement context may correspond to one of a producer, a category of producers, a curator, a category of curators, a merchant, a category of merchants, a product, a category of products, a service, a category of service, an event a category of events, a merchant, a place, a category of places, or any combination thereof.

It is noteworthy, that the IRL-MPA system may request that an audience member register with the IRL-MPA system prior to interacting with an engagement entity on the engagement platform. In doing so, the IRL-MPA system may capture profile data for the audience member, such as demographic data, categories of product interest, categories of service interest, categories of IRL-media data interest, or any combination thereof.

At 506, the IRL-MPA system generate an audience-interaction (AI) score for the current interaction between the audience member and the first engagement entity on the engagement platform. The AI-score may numerically quantify a relevancy of an engagement entity's current interaction with an audience member on the engagement platform. In one example, the IRL-MPA system may generate the AI-score based on data patterns between the engagement metadata and profile data associated with the engagement entity.

At 508, the IRL-MPA system may determine whether the AI-score is greater than or equal to a predetermined AI threshold. In some examples, the predetermined AI threshold may be set by an administrator of the IRL-MPA system. In one example, the IRL-MPA system may determine that the AI-score is less than the predetermined threshold. In doing so, the IRL-MPA system may return to step 502, and continue to monitor a current interaction between the audience member and the first engagement entity on the engagement platform.

At 510, the IRL-MPA system may determine that the AI-score is greater than or equal to the predetermined AI threshold. In doing so, the IRL-MPA system may analyze the engagement metadata of the current interaction relative to profile data associated with additional engagement entities that are registered with the IRL-MPA system. The IRL-MPA system may assign each additional engagement entity with a similarity score that quantifies a degree of correlation between engagement metadata of the current interaction and profile data of each additional engagement entity.

In doing so, the IRL-MPA system may present the first engagement entity with a recommendation to solicit an interaction with a second engagement entity (i.e., additional engagement entity), based at least in part on the similarity score of the second engagement entity being greater than or equal to a predetermined similarity threshold. In this example, the predetermined similarity threshold may be set by an administrator of the IRL-MPA system.

FIG. 6 illustrates a flow diagram of an In-Real Life (IRL) Media Platform Analytics (IRL-MPA) system process for generating one or more recommendations for an engagement entity, based at least in part on an analysis of a current interaction between an engagement entity and an audience member using a statistical model. The statistical model may numerically represent a plurality of historical interactions between engagement entities and various audience members over a predetermined time interval. In this way, the IRL-MPA system use the statistical model to provide an engagement entity with one or more recommendations to solicit an interaction with another engagement entity based on a correlation of data patterns between a current interaction and the dataset of historical interactions.

At 602, the IRL-MPA system may generate a statistical model, based at least in part on a dataset of historical interactions between a plurality of engagement entities and various audience members over a predetermined time interval. In some examples, the statistical model may comprise of a numerical distribution of the data points based on correlations within the underlying, dataset of historical interactions.

At 604, the IRL-MPA system may monitor a current interaction between an audience member and the first engagement entity on an engagement platform. Further, the IRL-MPA system determine an AI-score for the current interaction, based on a correlation between the engagement metadata of the current interaction and profile data of the first engagement entity.

At 606, the IRL-MPA system may determine whether the AI-score of the current interaction is greater than or equal to a predetermined AI threshold. In one example, the IRL-MPA system may determine that the AI-score is less than the predetermined threshold. In doing so, the IRL-MPA system may return to step 604, and continue to monitor a current interaction between the audience member and the first engagement entity on the engagement platform.

At 608, the IRL-MPA system may determine that the AI-score of the current interaction is greater than or equal to the predetermined AI threshold. In doing so, the IRL-MPA system may use the statistical model to analyze for data patterns between the engagement metadata of the current interaction and the dataset of historical interactions.

At 610, the IRL-MPA system may identify a subset of audience members, based at least in part on a correlation between the engagement metadata of the current interaction and the data-points of the statistical model. More specifically, the IRL-MPA system may assign a similarity score to each audience member (i.e., derived from data-points of the statistical model), and further generate the subset of audience members by aggregating individual audience members with similarity scores that are greater than or equal to a predetermined similarity threshold.

At 612, the IRL-MPA system may identify a second engagement entity from profile data associated with at least one audience member of the subset of audience members. In doing so, the IRL-MA system may present the first engagement entity with a recommendation to solicit an interaction with the second engagement entity, based at least in part on a commonly shared, audience.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
  receive, from a producer device, raw In-Real Life (IRL)-media data;
  generate, via a curator input, curated IRL-media data, based at least in part on the raw IRL-media data, the curated IRL-media data including a temporal placement of a product-service offering;
  based on the curated IRL-media data, generate a plurality of IRL-media data for transmission to more than one type of third-party multimedia platform for dissemination to audience devices;
  receive, from a consumer of the curated IRL-media data through an audience device of the audience devices, an engagement request to establish a communication channel between the consumer of the curated IRL-media data and a first engagement entity associated with the curated IRL-media data, wherein the first engagement entity is one of a producer of the raw IRL-media data, a first merchant associated with the product-service offering that is embedded within the curated IRL-media data, or a second merchant associated with the curator input of the curated IRL-media data;
  establish, on an engagement platform, a real-time communication connection for an individual interaction between the consumer of the curated IRL-media data and the first engagement entity, based at least in part on the engagement request;
  parse engagement entity profile data associated with the first engagement entity to identify interests and preferences associated with the first engagement entity;
  analyze communications between the consumer of the curated IRL-media data and the first engagement entity over the real-time communication connection to generate current engagement metadata;
  generate an Audience Interaction (AI)-score for the individual interaction, based at least in part on analysis of the current engagement metadata and the interests and preferences associated with the first engagement entity; and generate, for transmission to an engagement device of the first engagement entity, one or more recommendations related to interactions between the first engagement entity and a second engagement entity that is another of the producer of the raw IRL-media data, the first merchant associated with the product-service offering that is embedded within the curated IRL-media data, or the second merchant associated with the curator input of the curated IRL-media data, based at least in part on comparing the AI-score to a predetermined threshold.

2. The system of claim 1, wherein the one or more modules are further executable by the one or more processors to:

in response to receipt of the raw IRL-media data from the producer device, cause a user interface of the producer device to display a first selectable option and a second selectable option, the first selectable option corresponding to a selection of a product-service offering from a plurality of product-service offerings for incorporation into the curated IRL-media data, and the second selectable option corresponding to a form of the temporal placement of the product-service offering within the curated IRL-media data; and receive, via the producer device, a first selection that is associated with the first selectable option and a second selection that is associated with the second selectable option, and wherein, the curator input to generate the curated IRL-media data is based at least in part on the first selection and the second selection.

3. The system of claim 2, wherein the form of the temporal placement of the product-service offering corresponds to one of an interstitial placement of the product-service offering within the curated IRL-media data that is configured to commence at a selected point in time during the curated IRL-media data, or an inset placement of the product-service offering that is configured to commence at a selected point in time during the curated IRL-media data.

4. The system of claim 2, wherein the one or more modules are further executable by the one or more processors to:

cause the user interface of the producer device to display a third selectable option of one or more curating merchants with service offerings to curate the raw IRL-media data; and receive, via the producer device, a third selection of a curating merchant of the one or more curating merchants, and wherein, the curator input to generate the curated IRL-media data is further based at least in part on the curating merchant.

5. The system of claim 1, wherein the one or more modules are further executable by the one or more processors to:

generate an engagement request for the curated IRL-media data that includes one or more selectable options to communicatively engage within one or more engagement entities that include the producer of the raw IRL-media data, the first merchant associated with the product-service offering that is embedded within the curated IRL-media data, and the second merchant associated with the curator input of the curated IRL-media data on the engagement platform, and wherein, to generate the curated IRL-media data further includes at least one of an interstitial placement of the engagement request within the curated IRL-media data, or an inset placement of the engagement request that is embedded within the curated IRL-media data.

6. The system of claim 1, wherein the real-time communication connection corresponds to one of a real-time audio-based communication connection, a real-time text-based communication connection, a real-time audio-visual communication connection, or a real-time social media platform connection.

7. The system of claim 1, wherein the one or more modules are further executable by the one or more processors to:

retrieve, from a data-store, historical engagement metadata that corresponds to historical instances of interaction via the engagement platform by the first engagement entity;

generate an engagement entity statistical model associated with the first engagement entity, based at least in part on the historical engagement metadata; and analyze the current engagement metadata to identify similarities between the consumer of the curated IRL-media data of the audience device and the first engagement entity, based at least in part on the engagement entity statistical model, and wherein, to generate the one or more recommendations is based at least in part on analysis of the current engagement metadata.

8. The system of claim 1, wherein the current engagement metadata includes at least one of location data associated with the audience device or the engagement device, keywords derived from the real-time communication, or profile data associated with the consumer of the curated IRL-media data or the first engagement entity.

9. The system of claim 1, wherein the one or more modules are further executable by the one or more processors to:

determine an engagement context of the real-time communication between the consumer of the curated IRL-media data and the first engagement entity, based at least in part on the current engagement metadata, the engagement context corresponding to one of a product, category of products, a service, a category of services, an event, a category of events, a merchant, a category of merchants, a place, or a category of places, and wherein, to generate the one or more recommendations is further based at least in part on the engagement context.

10. The system of claim 1, wherein the one or more modules are further executable by the one or more processors to:

determine that the AI-score for the individual interaction between the first engagement entity and the consumer of the curated IRL-media data is greater than a predetermined threshold; and transmit at least one recommendation to the first engagement entity based at least in part on the AI-score being greater than the predetermined threshold.

11. The system of claim 1, wherein the first engagement entity, the second engagement entity, and the consumer of the curated IRL-media data are different.

12. One or more non-transitory computer-readable media storing computer-executable instructions that, when executed on one or more processors, cause the one or more processors to perform acts comprising:

generating curated IRL-media data associated with a first engagement entity, based at least in part on receipt of a raw IRL-media data, the curated IRL-media data including a temporal placement of a product-service offering, wherein the first engagement entity is one of a producer of the raw IRL-media data, a first merchant associated with the product-service offering that is embedded within the curated IRL-media data, or a second merchant associated with a curator input of the curated IRL-media data;

transmitting the curated IRL-media data for dissemination to at least one third-party multimedia platform;

establishing, on an engagement platform, a real-time communication connection for an individual interaction between a consumer of the curated IRL-media data through an audience device associated with the third-party multimedia platform and the first engagement entity through an engagement device;

parsing engagement entity profile data associated with the first engagement entity to identify interests and preferences associated with the first engagement entity;

analyzing engagement metadata associated with the real-time communication connection;

generating an Audience Interaction (AI)-score for the individual interaction between the first engagement entity and the consumer of the curated IRL-media data, based at least in part on analysis of the engagement metadata of the real-time communication connection and the interests and preferences associated with the first engagement entity;

generating, for the first engagement entity, at least one recommendation related to interactions between the first engagement entity and a second engagement entity that is another of the producer of the raw IRL-media data, the first merchant associated with the product-service offering that is embedded within the curated IRL-media data, or the second merchant associated with the curator input of the curated IRL-media data, based at least in part on comparing the AI-score to a predetermined threshold; and transmitting, to the engagement device of the first engagement entity, the at least one recommendation.

13. The one or more non-transitory computer-readable media of claim 12, further storing instructions that, when executed cause the one or more processors to perform acts comprising:

retrieving, from a data-store, a first profile of the consumer of the curated IRL-media data associated with the audience device and a second profile associated with the first engagement entity, and wherein, analyzing the engagement metadata further includes identifying data patterns between the real-time communication and the second profile of the first engagement entity.

14. The one or more non-transitory computer-readable media of claim 12, wherein, the engagement entity corresponds to a merchant associated with the product-service offering, and further storing instructions that, when executed cause the one or more processors to perform acts comprising:

retrieving, via a data-store, profile data associated with the consumer of the curated IRL-media data of the audience device;

identifying, an additional producer of raw IRL-media data that the consumer of the curated IRL-media data has previously engaged on the engagement platform, based at least in part on the profile data, and wherein the at least one recommendation is further related to soliciting the additional producer of raw IRL-media data to incorporate the product-service offering associated with the merchant within a prospective IRL-media data; and transmitting the at least one recommendation to the merchant.

15. The one or more non-transitory computer-readable media of claim 12, wherein, the first engagement entity corresponds to the first merchant associated with the product-service offering, and further storing instructions that, when executed cause the one or more processors to perform acts comprising:

retrieving, via a data-store, profile data associated with the consumer of the curated IRL-media data of the audience device;

identifying an additional producer of raw IRL-media data that the consumer of the curated IRL-media data has previously engaged on the engagement platform, based at least in part on the profile data, and transmitting an additional recommendation to the first merchant that corresponds to a request for curating services from an additional producer of raw IRL media data for a prospective curated IRL-media data.

16. The one or more non-transitory computer-readable media of claim 12, wherein the first engagement entity corresponds to the producer of the raw IRL-media data, and further storing instructions that, when executed cause the one or more processors to perform acts comprising:

retrieving, via a data-store, profile data associated with the consumer of the curated IRL-media data of the audience device;

identifying, one or more merchants that the consumer of the curated IRL-media data has previously engaged on the engagement platform; and wherein the at least one recommendation corresponds to a recommendation to solicit the one or more merchants to present product-service offerings for incorporation within a prospective curated IRL-media data.

17. A computer-implemented method, comprising:
under control of one or more processors:

receiving, via a producer device, raw In-Real-Life (IRL) media data and a request for curating services to generate curated IRL-media data that is based at least in part on the raw IRL-media data;

generating, the curated IRL-media data for transmission to at least one third-party multimedia platform for dissemination to one or more audience devices;

receiving, from a consumer of the curated IRL-media data through an audience device, an engagement request to establish a real-time communication connection with at least a producer associated with the raw IRL-media data;

establishing, on an engagement platform, the real-time communication connection for an individual interaction between the consumer of the curated IRL-media data through and the producer through a producer device associated with the producer, the real-time communication connection corresponding to one of a real-time audio or a real-time audio-visual connection;

parsing producer profile data associated with the producer to identify interests and preferences associated with the engagement entity;

analyzing current engagement metadata associated with the real-time communication connection to identify similarities between the consumer of the curated IRL-media data through associated with the audience device and the producer;

generating an Audience Interaction (AI)-score for the real-time communication connection between the consumer of the curated IRL-media data through and the producer, based at least in part on analysis of the current engagement metadata and the interests and preferences associated with the producer; and generating, for transmission to the producer device of the producer, one or more recommendations related to interactions between the producer and an engagement entity that is a first merchant associated with a product-service offering that is embedded within the curated IRL-media data, or a second merchant associated with a curator input of the curated IRL-media data, based at least in part on analysis of the AI-score.

18. The computer-implemented method of claim 17, further comprising:
retrieving, from a data-store, profile data associated with the consumer of the curated IRL-media data; and
identifying a particular merchant that the consumer of the curated IRL-media data has previously engaged on the engagement platform, based at least in part on the profile data, and
wherein, the one or more recommendations is based at least in part on the particular merchant.

19. The computer-implemented method of claim 17, further comprising:

retrieving, from a data-store, historical engagement metadata that corresponds to historical instances of interactions via the engagement platform by the producer; and
generating a producer-engagement model to identify similarities between the consumer of the curated IRL-media data of the audience device and the producer, based at least in part on the historical engagement metadata, and
wherein, analyzing the current engagement metadata is based at least in part on the producer-engagement model.

20. The computer-implemented method of claim 17, further comprising:
retrieving, profile data associated with the producer;
identifying at least one third-party multimedia platform that is associated with the producer, based at least in part on the profile data;
generating IRL-media data for transmission to the at least one third-party multimedia platform for dissemination to the one or more audience devices, the IRL-media data including the curated IRL-media data and computing executable instructions that configure the curated IRL-media data for execution via the at least one third-party multimedia platform; and
transmitting the IRL-media data to the at least one third-party multimedia platform.

* * * * *